United States Patent
Wang et al.

(10) Patent No.: US 12,095,889 B2
(45) Date of Patent: Sep. 17, 2024

(54) PROCESSING QUEUE ASSIGNMENT BASED ON A FLAG IN A GENEVE HEADER

(71) Applicant: VMware LLC, Palo Alto, CA (US)

(72) Inventors: Yong Wang, San Jose, CA (US); Guolin Yang, San Jose, CA (US); Eduard Serra Miralles, Redwood City, CA (US); Dexiang Wang, Sunnyvale, CA (US); Qing Chang, San Ramon, CA (US)

(73) Assignee: VMware LLC, Palo Alto, CA (US)

( * ) Notice: Subject to any disclaimer, the term of this patent is extended or adjusted under 35 U.S.C. 154(b) by 122 days.

(21) Appl. No.: 17/581,674

(22) Filed: Jan. 21, 2022

(65) Prior Publication Data

US 2023/0239378 A1    Jul. 27, 2023

(51) Int. Cl.
*H04L 69/22* (2022.01)
*H04L 47/31* (2022.01)
*H04L 47/62* (2022.01)
*H04L 47/78* (2022.01)

(52) U.S. Cl.
CPC ............ *H04L 69/22* (2013.01); *H04L 47/31* (2013.01); *H04L 47/6235* (2013.01); *H04L 47/78* (2013.01)

(58) Field of Classification Search
None
See application file for complete search history.

(56) References Cited

U.S. PATENT DOCUMENTS

2019/0312820 A1* 10/2019 Yu .......................... H04L 45/74
2020/0059421 A1*  2/2020 Wang ...................... H04L 49/70

OTHER PUBLICATIONS

Gross et al., "Geneve: Generic Network Virtualization Encapsulation", draft-ietf-nvo3-geneve-16, Mar. 7, 2020 (Year: 2020).*
Brockners et al., "Geneve encapsulation for In-situ OAM Data" draft-brockners-ippm-ioam-geneve-04, May 13, 2020 (Year: 2020).*
Gross et al., "Geneve: Generic Network Virtualization Encapsulation", IETF; Nov. 2020; 19 pages.
International Search Report & Written Opinion for PCT Application No. PCT/US2023/011051, mailed Apr. 11, 2023; 10 pages.
Min et al.; "BFD for Geneve"; NVO3 Working Group; 2021 IETF Trust; May 14, 2021; pp. 1-10.
Mirsky, et al. "OAM for use in Geneve"; NVO3 Working Group; Sep. 25, 2020; pp. 1-11.

* cited by examiner

*Primary Examiner* — Alex Skripnikov
(74) *Attorney, Agent, or Firm* — Quarles & Brady LLP

(57) ABSTRACT

Described herein are systems, methods, and software to manage the identification of control packets in an encapsulation header. In one implementation, a computing system may receive a Geneve packet at a network interface and determine that the Geneve packet includes an Operations and Management (OAM) flag. Once the OAM flag is identified, the computing system can select a processing queue from a plurality of processing queues for a main processing system of the computing system based on the OAM flag and assign the Geneve packet to the processing queue.

18 Claims, 8 Drawing Sheets

PROCESSING QUEUE ASSIGNMENT BASED ON A FLAG IN A GENEVE HEADER

TECHNICAL BACKGROUND

In computing environments, software defined networks (SDNs) may be used that comprise software modules or appliances capable of providing a communication platform for one or more virtual nodes in the computing environment. The SDNs, which may include virtual switches, routers, distributed firewalls, and the like, may be used to intelligently direct communication on the network by inspecting packets before passing them to other nodes on the same network. To provide the required operations, SDNs may be separated into a data plane, which is used to manage communications for active nodes (virtual machines and containers) in the computing environment, and a control plane, which is used to configure the various virtual switches, routers, distributed firewalls, and the like, as well as identify the operational status of elements within the computing environment.

In some implementations, SDNs use control packets, such as Bidirectional Forwarding Detection (BFD) packets, Border Gateway Protocol (BGP) packets, and other similar control packets, which have the requirement of reliable and timely delivery. If, for any reason not related to network failure, the control packets are not delivered within a certain period, unnecessary actions (such as fail over to a standby node or tear down of a BGP session) will be taken based on the assumption that a network failure has occurred. Using BFD as an example, control packets could be exchanged between transport nodes (hypervisors or gateway nodes, such as Virtual Extensible Local Area Network (VXLAN) tunnel endpoints (VTEPs)), between gateway nodes in a gateway cluster, or between a gateway and a remote router. In an SDN, when control packets are communicated over virtual network interfaces and/or physical network interfaces, the control packets will be mixed with other data packets which are less sensitive to packet drops or delays. Under high load, those control packets can be dropped or significantly delayed by the network interface, which may cause various unnecessary disruptions to the network functions.

Recently, Geneve has become a popular encapsulation protocol for SDN because of its extensibility, among other reasons. Request for Comments (RFC) 8926 promulgated by the Internet Engineering Task Force (IETF) expresses the Geneve protocol standard and defines the format for the Geneve encapsulation header. The proposed standard defines the header format that includes a one-bit "OAM Packet" field that indicates the packet is an Operations, Administration, and Maintenance (OAM) protocol packet. The Geneve standard requires that when this bit is set, "endpoints MUST NOT forward the payload and transit devices MUST NOT attempt to interpret or process it." The standards document further states that "it is RECOMMENDED that endpoints direct these packets to a high priority control queue."

As further explained in an Internet-Draft entitled "OAM for use in GENEVE" prepared by the NVO3 Working Group for the IETF, dated Mar. 9, 2020, the OAM protocols provide a control channel between Geneve tunnel endpoints for fault detection, diagnostics, maintenance, and other functions, where "such a control tunnel is dedicated to carrying only control and management data between tunnel endpoints" and that OAM packets received over the tunnel should not be forwarded. While Geneve-aware physical NICs can be configured to separately queue and prioritize OAM packets, the OAM protocols are often not implemented between endpoints, which opens the OAM field for other uses.

SUMMARY

The technology described herein manages the identification of control packets in encapsulation packet. In one implementation, a first computing system identifies a packet to be encapsulated and forwarded to a second computing system and determines that the packet comprises a control packet based on values in the packet. The first computing system further, in response to determining the packet comprises a control packet, encapsulates and communicates the packet as a Geneve packet, wherein an Operations and Management (OAM) flag is set in a header of the Geneve packet.

In some implementations, a second computing system receives the Geneve packet at a network interface and determines that the Geneve packet includes the OAM flag. In response to determining that the Geneve packet includes the OAM flag, the second computing system selects a processing queue from a plurality of processing queues based on the OAM flag and assigns the Geneve packet to the processing queue.

DETAILED DESCRIPTION

Figure 1:
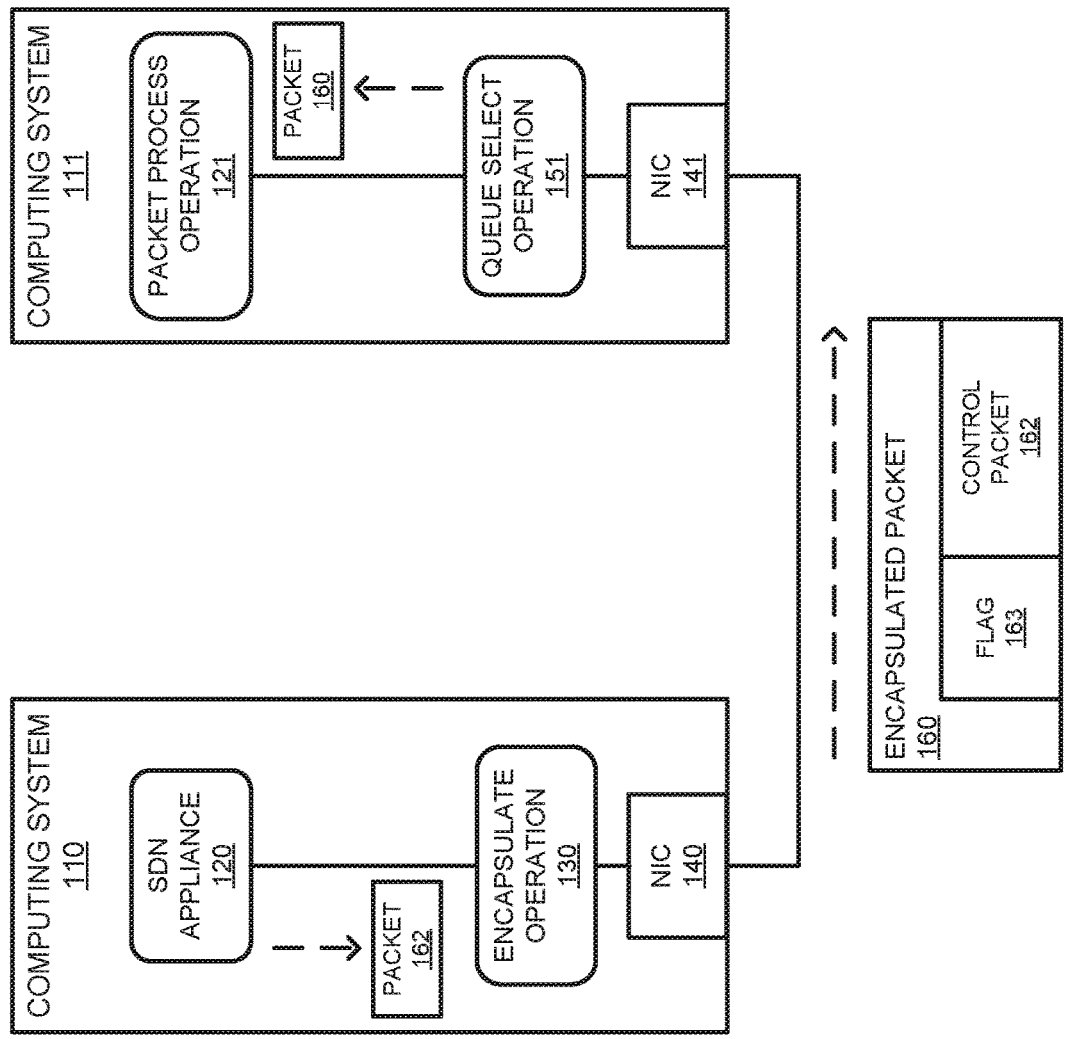
FIG. 1 illustrates a computing environment to identify control packets in an encapsulation header according to an implementation.

FIG. 1 illustrates a computing environment 100 to identify control packets in an encapsulation header according to an implementation. Computing environment 100 includes computing systems 110-111. Computing system 110 further includes SDN appliance 120, encapsulate operation 130, and network interface (NIC) 140. Computing system 111 further includes packet process operation 121, queue select operation 151, and NIC 141. Computing environment 110 further includes control packet 162 and encapsulated packet 160 that includes both control packet 162 and Operations and Management (OAM) flag 163. Encapsulate operation 130 is further described below in FIG. 2 and queue select operation 151 is further described below in FIG. 3. Although demonstrated as executing outside of NIC 141, in some examples, queue select operation 151 may be implemented wholly or partially as part of a processing system for NIC 141. The processing system for NIC 141 may be separate from the main processing system of computing system 111, wherein the main processing system may represent the central processing unit (CPU) of the computing system.

In computing environment 100, computing systems 110-111 may comprise host computing systems, gateway computing systems that can provide Virtual Extensible Local Area Network (VXLAN) tunnel endpoints (VTEPs), or some other computing system or router. Computing systems 110-111 may be used to support a virtualization environment, wherein the virtualization environment may include virtualized endpoints, including virtual machines, containers, or other virtualized endpoints, and may include software appliances that provide various software defined networking (SDN) services. These SDN services may include routing services, firewall services, network address translation services, virtual private networking services, or some other service. For example, SDN appliance 120 on computing system 110 may represent a logical routing appliance or some other SDN appliance. In some implementations, the SDN appliance may represent a virtual machine or a container.

To manage the configuration of the SDNs, a control plane is used to configure and maintain the SDN appliances across one or more computing systems. For example, the control plane may be used to configure a distributed firewall that is deployed for the computing environment to limit the communications for virtual machines or containers in computing environment 100. Additionally, the control plane may be used to verify the operational status of the various virtual networking appliances in the computing environment. For example, Bidirectional Forwarding Detection (BFD) packets may be exchanged between logical routers deployed on multiple computing systems to verify the operational status of the logical routers. If a logical router fails to provide a BFD packet within a particular period, a failover event may occur, which is used to maintain the operations of the network. This may include moving the operations of the logical router to another computing system, migrating virtual machines, or some other failover operation.

Here, to limit delay in the communication of BFD packets, Border Gateway Protocol (BGP) packets, or some other control packet, encapsulate operation 130 and queue select operation 151 are provided. Encapsulate operation 130, which may execute at least partially on a VTEP in some examples, may identify control packets based on pattern matching values within the packet, wherein the values may indicate that the packet is a BFD, BGP, or some other network control packet. In response to identifying a control packet, encapsulate operation 130 can be used to encapsulate the control packet as a Geneve packet and set an Operations and Management (OAM) flag in the Geneve header, wherein the OAM flag is an existing recognizable flag for Open vSwitch (OVS) in the Geneve header.

Once encapsulated, the Geneve packet is forwarded to computing system 111, wherein queue select operation 151 is performed. Queue select operation 151 may determine whether the packet comprises a control packet based on whether the OAM flag is set. When the flag is set, queue select operation 151 may select a first processing queue from a plurality of processing queues, wherein the first processing queue may provide a quality of service that is different than from the remaining processing queues at computing system 111. The different quality of service may include a different processing core allocation on the main processing system of computing system 111, clock cycle allocation on the main processing system of computing system 111, memory allocation on computing system 111, or some other different allocation of processing system resources at computing system 111. Once allocated to the queue, the processing system may decapsulate control packet and process the control packet.

Using the example in computing environment 100, SDN appliance 120 generates a control packet 162 that is required to be communicated to computing system 111. The control packet may comprise a BFD, a BGP, or some other control packet, wherein the control packet may be communicated from an appliance executing on a computing system 110 to computing system 111. After the packet is identified and the addressing corresponds to a destination at computing system 111, encapsulate operation 130 encapsulates packet 162 as a Geneve encapsulated packet 160 and sets the OAM flag 163 in the header of the packet to indicate that the inner packet includes a control packet. Once encapsulated, encapsulated packet 160 is forwarded to computing system 111 where it is received at NIC 141. Queue select operation 151 determines that encapsulated packet 160 includes OAM flag 163 and allocates the packet to a processing queue of a plurality of processing queues associated with the control packets. The encapsulated packet 160 is then processed by packet process operation 121, wherein the processes on the packet may include decapsulating the packet, processing the information in the control packet, such as providing the control packet to a SDN appliance local to computing system 111, or providing some other operation.

Figure 2:
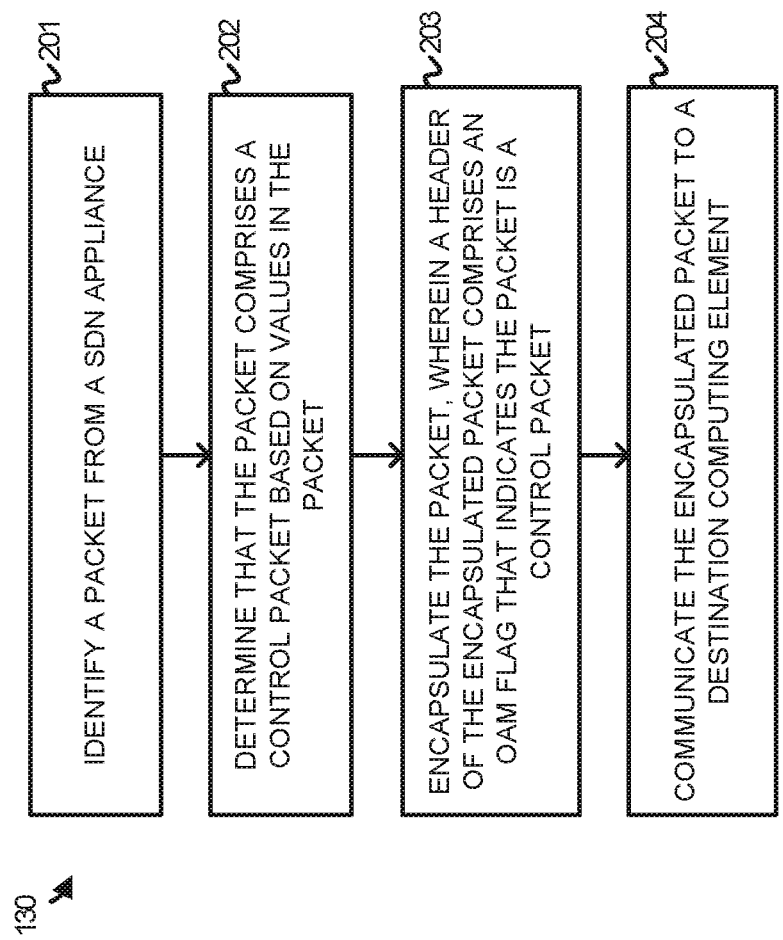
FIG. 2 illustrates an encapsulate operation of a computing system to encapsulate a control packet according to an implementation.

FIG. 2 illustrates an encapsulate operation 130 of a computing system to encapsulate a control packet according to an implementation. The steps of operation 130 are referenced parenthetically in the paragraphs that follow with references to systems and elements of computing environment 100. In some implementations, encapsulate operation 130 may be performed by a VTEP or other encapsulation endpoint capable of communicating control packet from a SDN appliance on a first computing system to a second computing system.

In FIG. 2, encapsulate operation 130 identifies (201) a packet from a SDN appliance. The SDN appliance may comprise a logical switch, a logical router, or some other SDN appliance. Once identified, encapsulate operation 130 determines (202) that the packet comprises a control packet based on values in the packet. In some implementations, encapsulate operation 130 may use packet inspection, including filters and/or offsets, to determine that values within that packet correspond to a control packet. For example, a packet from an SDN appliance can comprise a BFD packet directed to another SDN appliance on computing system 111. Encapsulate operation 130 may perform a filter on the packet to determine whether bit values in the packet indicate that the packet is a BFD packet.

After the packet is determined to be a control packet, encapsulate operation 130 encapsulates (203) the packet as a Geneve packet, wherein a header of the encapsulated packet comprises an OAM flag that indicates that the packet is a control packet. The header may further include addressing associated with computing system 110-111 or other addressing information associated with the Geneve communication. Once encapsulated, encapsulate operation 130 communicates (204) the encapsulated packet to a destination computing element 204. In some implementations, the destination computing element may comprise a host computing system but may comprise an edge in some examples.

Although demonstrated as communicating a control packet, encapsulate operation 130 may also communicate non-control packets, such as data packets from a first virtual machine to a second virtual machine on computing system 111. When a data packet is identified, encapsulate operation 130 may encapsulate the packet and leave the OAM flag unset. Once encapsulated, the encapsulated packet can be forwarded toward the destination computing system.

Although demonstrated in the examples of FIGS. 1-2 as processing a packet after it is received at a physical network interface, similar operations can be performed when a packet is received at a virtual network interface (VNIC). The VNIC may receive the packet, determine whether the packet is a Geneve packet and includes a set OAM flag. If the OAM flag is present in the Geneve packet, then the packet may be placed in a processing queue associated with the OAM flag. The VNIC may be part of a virtual machine, container, or some other appliance. For example, the VNIC may be part of a VTEP implemented as a virtual machine on a computing system. The appliance will include different processing queues, wherein each of the processing queues is allocated processing resources.

Figure 3:
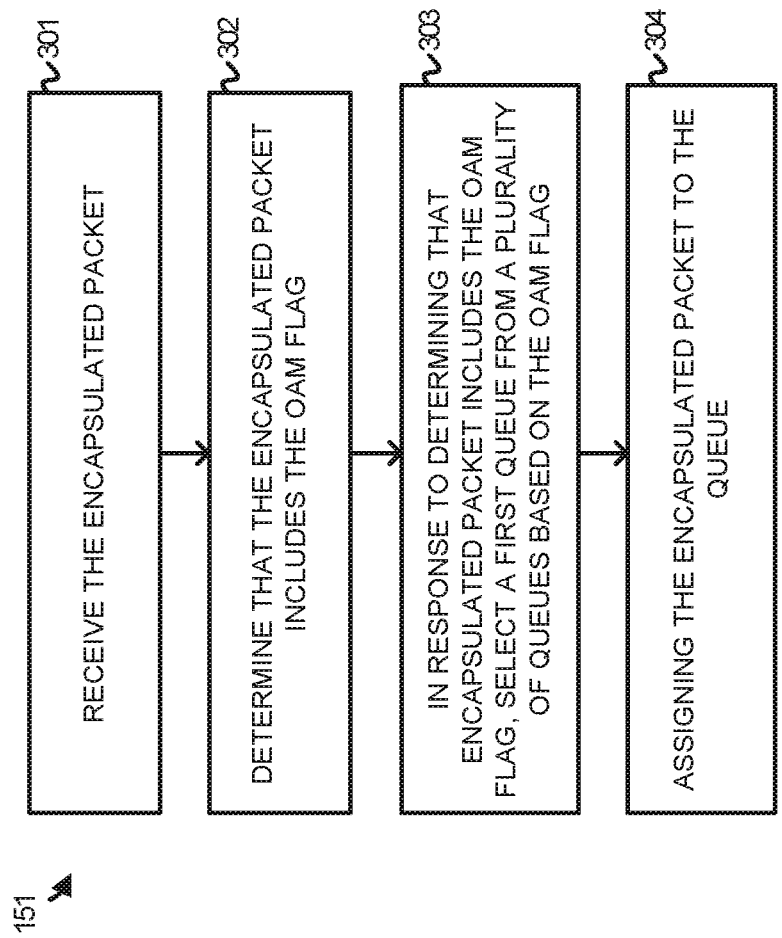
FIG. 3 illustrates a queue select operation of a computing system to select a queue for an encapsulated packet according to an implementation.

FIG. 3 illustrates a queue select operation 151 of a computing system to select a queue for an encapsulated packet according to an implementation. The steps of queue select operation 151 are referenced parenthetically in the paragraphs that follow with references to systems and elements of computing environment 100 of FIG. 1. Queue select operation 151 may be performed in a NIC processing system in some examples, wherein the NIC processing system may dictate queues for the main processing system.

In FIG. 3, queue select operation 151 receives (301) the encapsulated packet from computing system 110. Once received queue select operation 151 determines (302) that the encapsulated packet includes the OAM flag and, in response to determining that the encapsulated packet includes the OAM flag, selects (303) a first queue from a plurality of queues based on the OAM flag. After the processing queue is selected, queue select operation 151 assigns (304) the encapsulated packet to the processing queue. In some implementations, queue select operation 151 may be configured with a processing queue for encapsulated packets with the OAM flag, wherein the processing queue may be allocated first processing resources and the remaining processing queues are allocated second processing resources. In some implementations, queue select operation 151 may randomly or pseudo-randomly select a processing queue for encapsulated packets with the OAM flag, wherein the selected processing queue may be allocated first processing resources and the remaining processing queues are allocated second processing resources. The processing resources may include clock cycles, cores, memory, or some other processing resource. In some examples, the processing queue that is allocated for the control packets may provide a different quality of service than other processing queues in the plurality of processing queues. For example, the processing queue for control packets may provide a better quality of service than the other processing queues for the computing system.

After the encapsulated packet is assigned to the processing queue based on OAM in the packet, the encapsulated packet is processed by packet process operation 121. Packet process operation 121 may be performed by the main processing system and may include decapsulation of the Geneve packet, processing in accordance with a receiving SDN appliance for the packet (e.g., updating timers or keep alive status), or some other processing of the packet.

Although demonstrated as communicating the packet from computing system 110 to computing system 111, similar operations can be performed when communicating a control packet from computing system 111 to computing system 110. For example, a SDN appliance on computing system 111 may generate a control packet that is required to be sent to an SDN appliance on computing system 110. The packet can be encapsulated by computing system 111 as a Geneve packet with the OAM flag set in the header of the Geneve packet and forwarded to computing system 110. Computing system 110 can identify the OAM flag and allocate the packet Geneve packet to a queue for processing based on the OAM flag.

While demonstrated in the previous example as receiving an encapsulated packet with a set OAM flag, NIC 141 and queue selection operation may receive encapsulated packets without the set OAM flag or other data packets. When a packet is received that does not include the OAM flag, queue select operation 151 may select a different queue for the packet and allocate the packet to the different queue, wherein the different queue may comprise different resources than the queue selected for control packets.

Figure 4A:
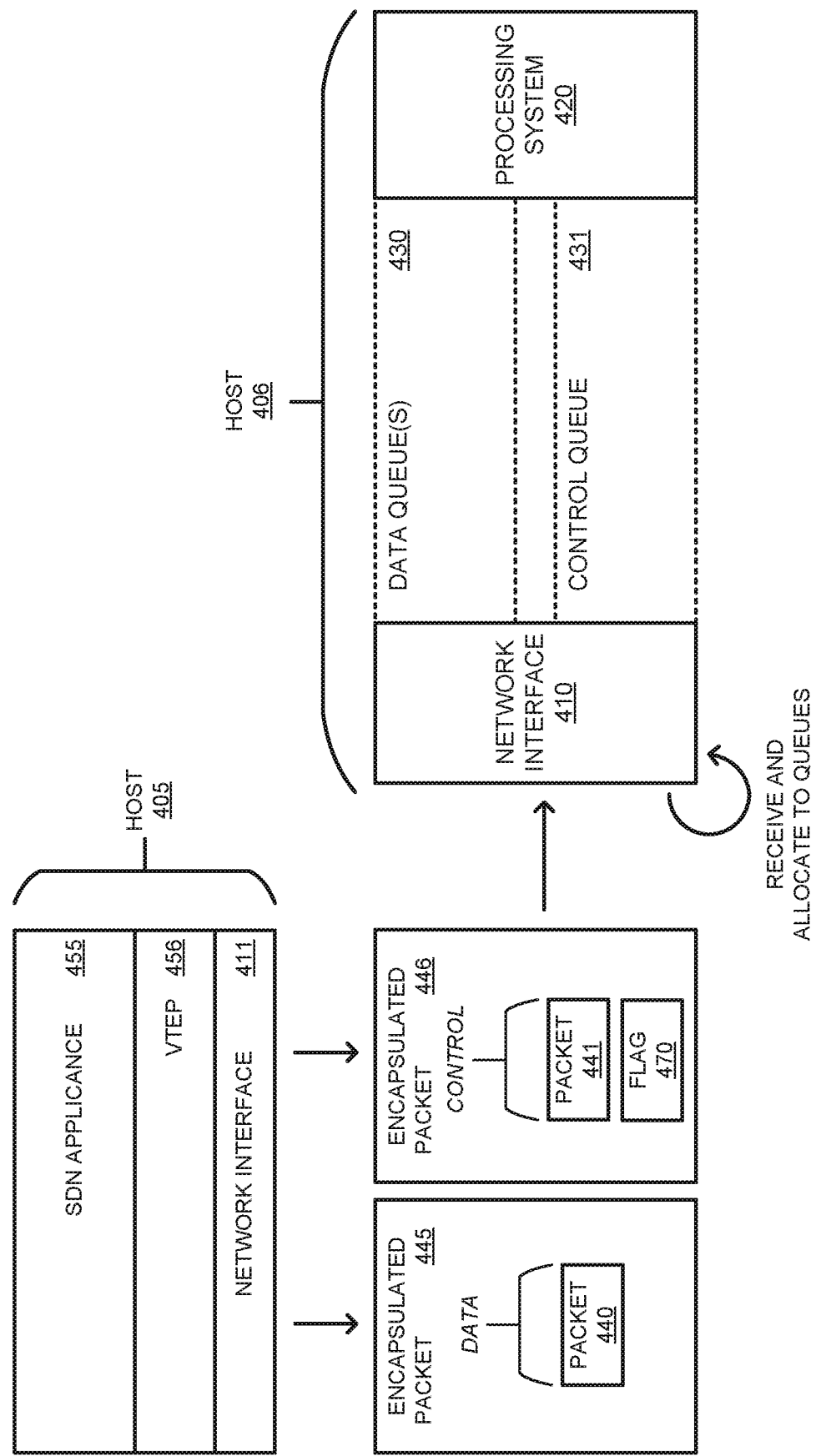
FIGS. 4A-4B illustrate an operational scenario or queue selection based on a header flag according to an implementation.
Figure 4B:
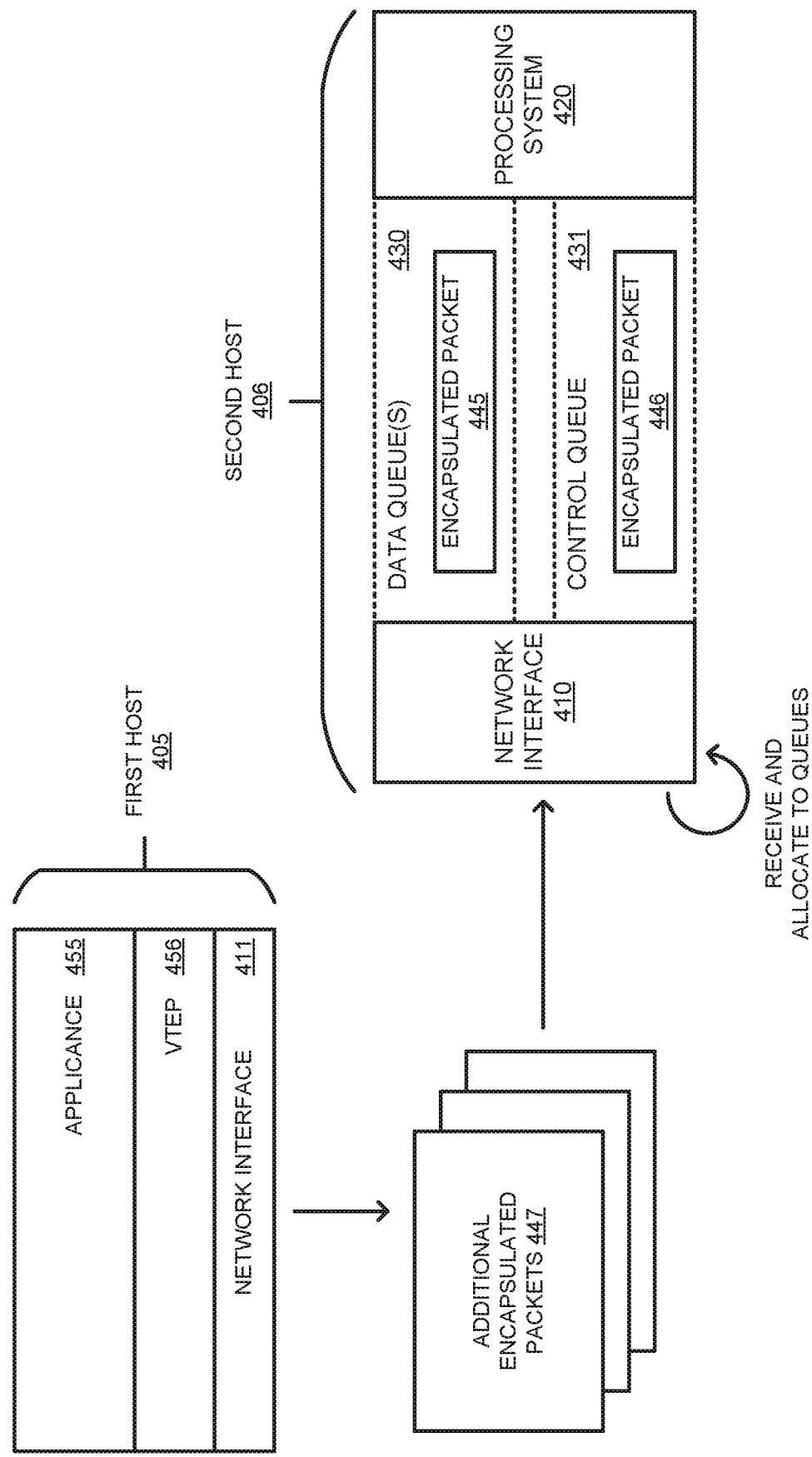

FIGS. 4A-4B illustrate an operational scenario or queue selection based on a header flag according to an implementation. FIGS. 4A-4B include hosts 405-406, SDN appliance 455, VTEP 456, network interfaces 410-411, processing system 420, data queue(s) 430, and control queue 431. FIG. 4A introduces Geneve encapsulated packets 445-446 with packets 440-441 and OAM flag 470. FIG. 4B introduces additional encapsulated packets 447. Network interface 410 may include the physical interface for receiving packets and a processing system capable of processing at least header information in the packets to allocate packets to different queues.

Referring first to FIG. 4A, encapsulated packets 445-446 are communicated by network interface 411, wherein the encapsulated packets are generated using VTEP 456. VTEP 456 is a tunnel endpoint that can be used to communicate both data and control packets with other computing systems. Here, VTEP 456 generates encapsulated packet 445 with a data packet 440 and further generates encapsulated packet 446 with control packet 441 and OAM flag 470. In generating the encapsulated packets, VTEP 456 may perform packet inspection and filtering to determine whether the traits of packets 440-441 comprise a control packet (e.g., BGP, BFD, or other networking control packet). When the packet comprises a data packet and not a control packet, the encapsulated packet will not include a set the OAM flag in the header of the encapsulated packet as demonstrated in encapsulated packet 445. In contrast, when the packet comprises a control packet, VTEP 456 will set the OAM flag in the header of the encapsulated packet, as demonstrated with OAM flag 470 in encapsulated packet 446. Once encapsulated, the packet is forwarded via network interface 411 toward network interface 410.

Turning to FIG. 4B, when encapsulated packets are received by network interface 410, a processing system associated with network interface 410 may perform packet inspection and filtering to determine whether a received packet includes a set OAM flag. When the packet includes the set OAM flag, such as with encapsulated packet 446, the packet is placed in control queue 431. When the packet does not include a set OAM flag, such as with encapsulated packet 445, the packet is placed in data queue(s) 430. Each queue of data queue(s) 430 and control queue 431 is representative of processing queues for processing system 420, wherein processing system 420 may represent the main processing system for host 406. The processing queues can each be allocated different processing resources, which may include, but are not limited to, clock cycles, cores, memory allocations, or some other resources. Advantageously, the processing system for network interface 410 may perform filtering operations to allocate packets to different processing queues based on attributes in the header of the packet. After allocating the packets to queues 430-431, host 405 may communicate additional encapsulated packets 447 and network interface 410 may process the packets in the same manner as encapsulated packets 445-446.

Although demonstrated as communicating only encapsulated packets, first host 405 may communicate and second host 406 may receive non-encapsulated packets. Host 406 and network interface 410 may process the non-encapsulated packets to determine the queue for the packet. In some examples, any packet without the OAM flag in the Geneve header is placed in data queue(s) 430. In other implementations, network interface 410 may perform other filtering that can put non-encapsulated control packets in control queue 431 or provide some other filtering operation.

In some examples, the configuration of the processing system for network interface 410 may be performed by an application executing on the main processing system. The application may dictate the filters (i.e., flags) to be identified in received packets, may dictate the processing queues for packets that qualify for the filters, or may dictate some other configuration to the processing system. The processing queue allocated for the control packets can be configured by an administrator, can be randomly or pseudo-randomly selected using software, or can be selected by any other means. The processing queue for the control packets may also be updated periodically, during down periods, or at some other interval to prevent possible attacks using packets that could be filtered to the same processing queue as the control packets.

Figure 5:
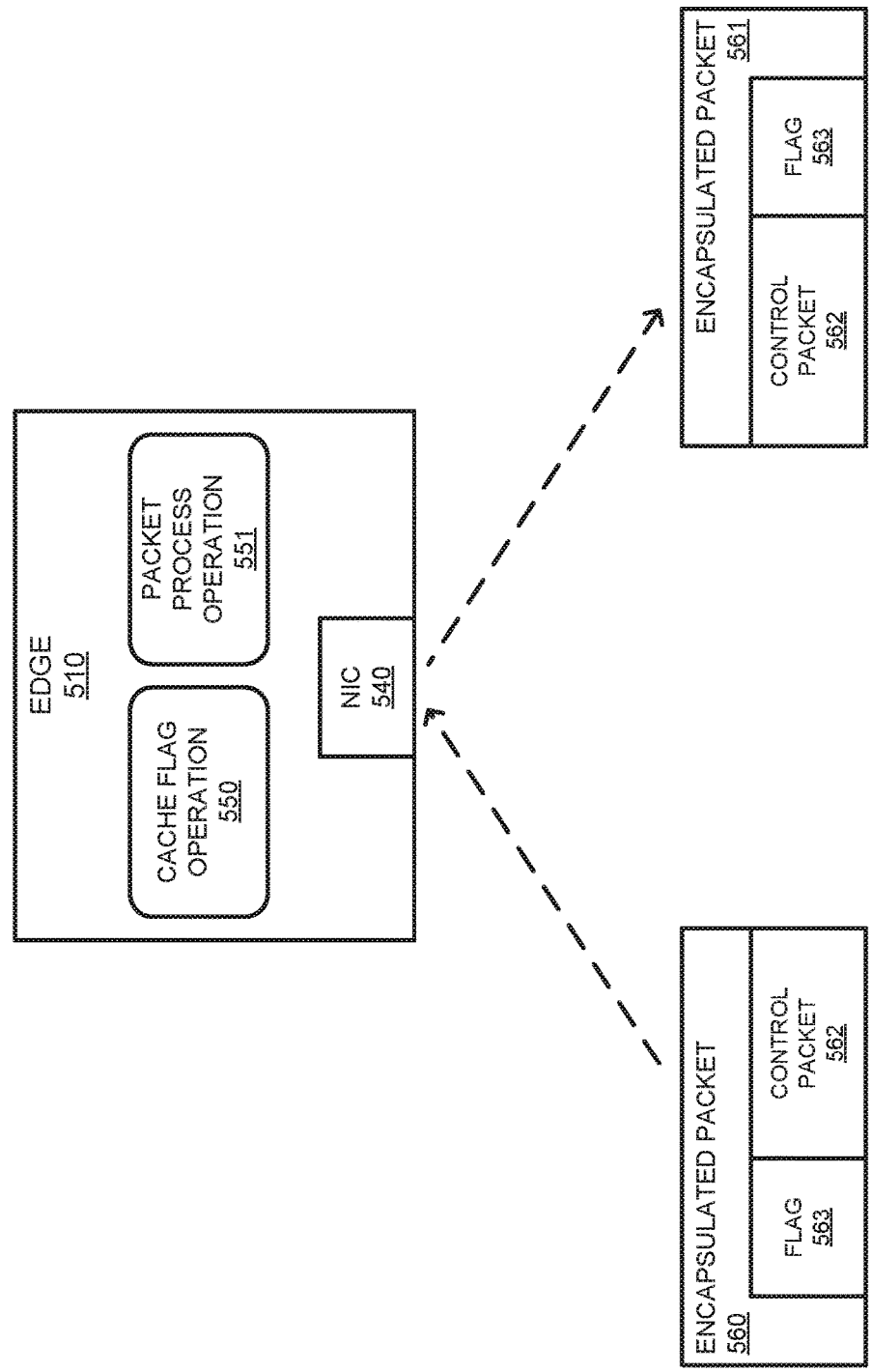
FIG. 5 illustrates an operational scenario of an edge gateway to cache a header flag identifying a control packet and apply the cached header flag to an egress packet according to an implementation.

FIG. 5 illustrates an operational scenario 500 of an edge gateway to cache a header flag identifying a control packet and apply the cached header flag to an egress packet according to an implementation. Operational scenario 500 further includes edge 510 and encapsulated packets 560-561. Edge 510 further includes cache flag operation 550, packet process operation 551, and NIC 540. Encapsulated packet 560 further includes OAM flag 563 and control packet 562, and encapsulated packet 561 further includes control packet 562 and OAM flag 563. Cache flag operation 550 may be implemented at least partially on a tunnel endpoint for edge 510, wherein the tunnel endpoint may be used to perform encapsulation and decapsulation of the packet.

In a computing environment, a host or another edge may communicate encapsulated packet 560 to edge 510. In generating encapsulated packet 560, the host or edge may identify that the packet comprises a control packet based on packet inspection and may encapsulate the packet as a Geneve packet with the OAM flag 563 set in encapsulated packet 560. Once encapsulated, the packet can be forwarded to edge 510 where the encapsulated packet is received by NIC 540. In response to receiving the packet, cache flag operation 550 may determine whether the OAM flag is set in the packet and may cache the flag in association with the packet. Once cached, the packet can be processed using packet process operation 551. In some implementations, the processing may include hashing addressing information in control packet 562 to determine a destination for the packet, applying one or more filters to control packet 562, or providing some other processing operation in association with the packet.

After processing the control packet 562, cache flag operation 550 may further be used in re-encapsulating control packet 562 to forward the packet to another edge or host. Specifically, when processing the packet using packet process operation 551, packet process operation 551 may indicate that the packet is to be forwarded to another host or edge. During the encapsulation process to generate encapsulated packet 561, cache flag operation 550 may reapply the cached flag associated with control packet. Once encapsulated, encapsulated packet 561 can be forwarded toward a destination host or edge. Advantageously, by caching the flag when encapsulated packet 560 is received, the packet can be reapplied without using extra filters or other processes to determine that the packet comprises a control packet.

Although demonstrated in the example of FIG. 5 using a physical network interface, similar operations may be performed by a virtual network interface. For example, edge 510 may be implemented as a virtual machine or a container in some examples. Cache flag operation 550 may cache the OAM flag when included, identify when control packet 562 is to be re-encapsulated, and add the cached OAM flag to the re-encapsulated packet.

Figure 6:
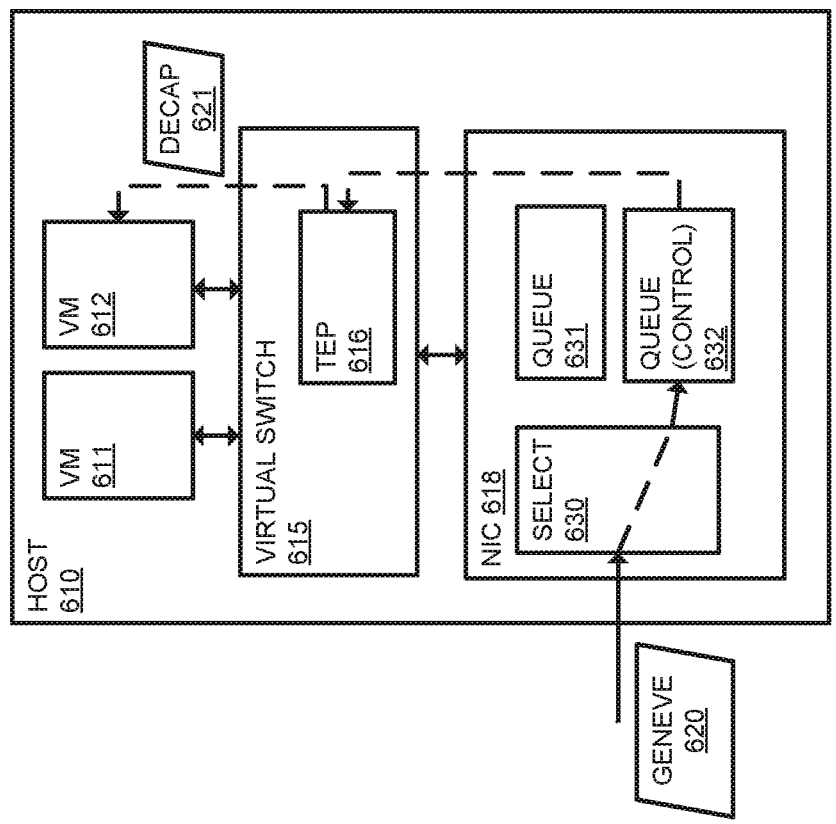
FIG. 6 illustrates an operational scenario of processing received packets according to an implementation.

FIG. 6 illustrates an operational scenario 600 of processing received packets according to an implementation. Operational scenario 600 includes geenve packet 620, decapsulated packet 621, and host 610. Host 610 further includes virtual machines (VMs) 611-612, virtual switch 615 with tunnel endpoint (TEP) 616, and NIC 618 with select operation 630 and queues 631-632.

In operational scenario 600, a Geneve packet 620 is received at NIC 618 of host 610. In response to receiving the packet, selection operation 530 selects a queue from queues 631-632 based on whether the Geneve packet includes a set OAM flag. The queues may each correspond to different resources, wherein the main processing system of host 610 may provide different resources to each of the queues. In the example of Geneve packet 620, select operation 630 performs packet inspection on Geneve packet 620 and identifies that the packet includes the OAM flag. Once identified, select operation 630 selects and assigns Geneve packet 620 to queue 632.

After the packet is assigned, the main processing system may extract the packet from the queue and decapsulate the packet at tunnel endpoint 616 working as part of virtual switch 615. When decapsulating the packet, the OAM flag along with other encapsulation information associated with the Geneve header. The decapsulated packet 621 is then forwarded to the destination virtual machine in this example.

Figure 7:
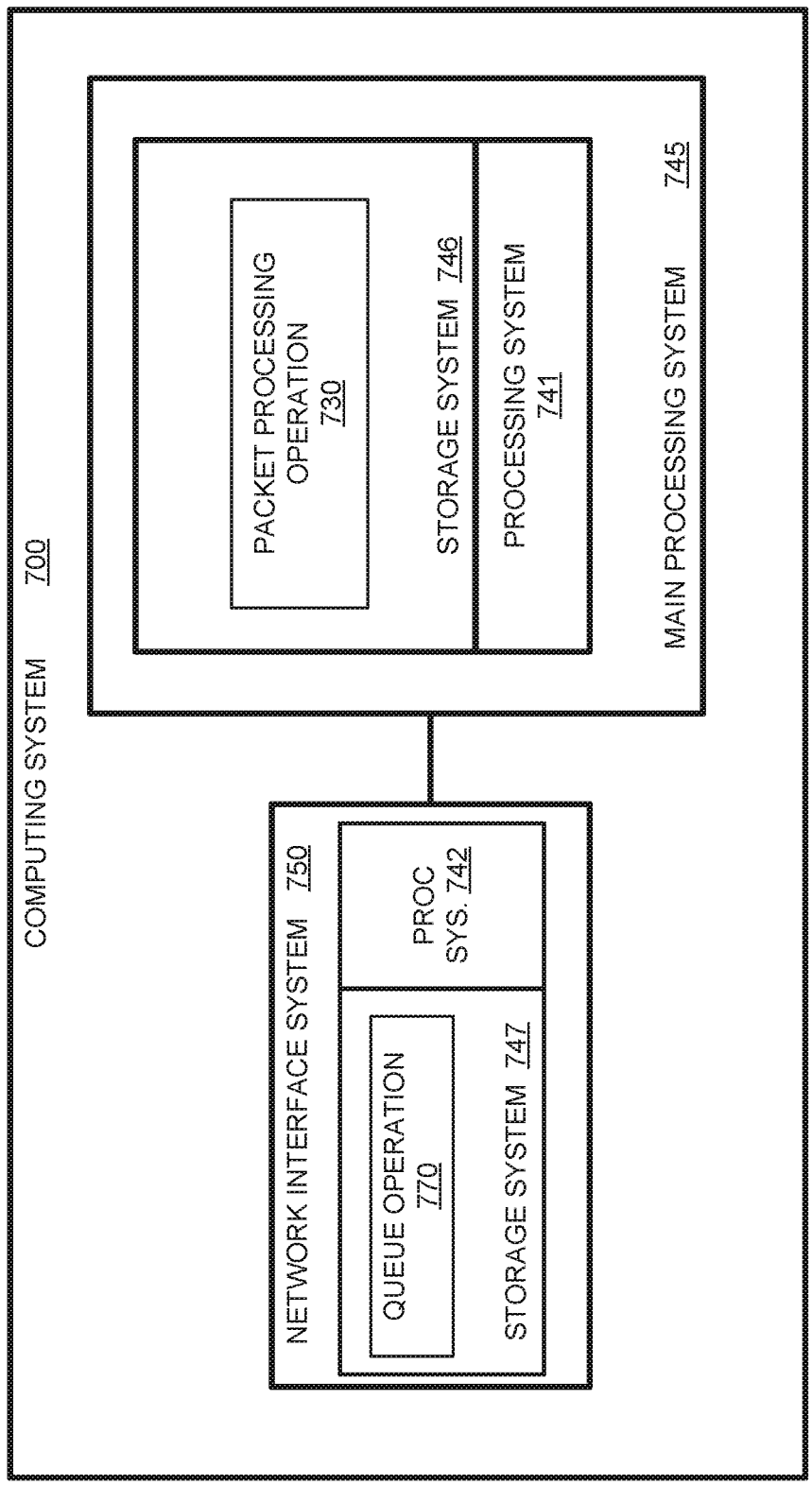
FIG. 7 illustrates a computing system to manage the identification of control packets according to an implementation.

FIG. 7 illustrates a computing system 700 to manage the identification of control packets according to an implementation. Computing system 700 is an example of computing systems 110-111 of FIG. 1, although other examples may exist. Computing system 700 includes network interface system 750 which is communicatively coupled to main processing system 745. Network interface system 750 includes storage system 747 and processing system 742, which is used to provide queue operation 770. Main processing system 745 includes storage system 746 and processing system 741, which is used to provide packet processing operation 730. Packet processing operation 730 may include VTEP operations, SDN appliance operations, virtual machine operations, container operations, or some other packet processing operation. For example, packet processing operation 730 may provide support for decapsulating an encapsulated packet, updating keep-alive timers based on the decapsulated packet, identifying forwarding policies for the decapsulated packet, or providing some other process on the packet.

In operation, network interface system 750 comprises components that communicate over communication links, such as network cards, ports, radio frequency (RF), processing circuitry and software, or some other communication devices. Network interface system 750 may be configured to communicate over metallic, wireless, or optical links. Network interface system 750 may be configured to use Time Division Multiplex (TDM), Internet Protocol (IP), Ethernet, optical networking, wireless protocols, communication signaling, or some other communication format—including combinations thereof. In some implementations, network interface system 750 may be configured to communicate with one or more other physical computing systems using both data and control packets. These systems may include host computing systems, edge computing systems, and the like.

Processing systems 741-742 comprise microprocessor and other circuitry that retrieves and executes operating software from storage systems 746-747, respectively. Storage systems 746-747 may each include volatile and non-volatile, removable and non-removable media implemented in any method or technology for storage of information, such as computer readable instructions, data structures, program modules, or other data. Storage systems 746-747 may each be implemented as a single storage device but may also be implemented across multiple storage devices or sub-systems. Storage systems 746-747 may each comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal. While demonstrated in the example of FIG. 7 with multiple storage systems 746-747, the storage systems may be shared in some implementations.

Processing systems 741-742 are typically mounted on a circuit board that may also hold the storage systems. The operating software of storage systems 746-747 comprise computer programs, firmware, or some other form of machine-readable program instructions. The operating software of storage system 747 comprises queue operation 770, while the operating software for storage system 746 includes packet processing operation 730, which may process packets for a SDN in some examples. The operating software on each storage system of storage systems 746-747 may further include an operating system, utilities, drivers, network interfaces, applications, or some other type of software. When read and executed by processing systems 741-742 the operating software on storage systems 746-747 direct computing system 700 to operate as described herein.

In one implementation, queue operation 770 directs processing system 742 to identify a Geneve packet received at the physical interface of network interface system 750 and determine that the Geneve packet includes an OAM flag. In response to determining that the Geneve packet includes an OAM flag, queue operation 770 directs processing system 742 to select a processing queue from a plurality of processing queues for main processing system 745 based on the OAM flag and allocate the flag to the selected processing queue. The processing queue selected for the Geneve packet may be allocated by an administrator of computing system 700, may be randomly selected, or may be selected using some other process. In some implementations, an application executing on main processing system 745 may be used to select processing queue and define a rule for Geneve packets with the OAM flag to be assigned to the selected queue. Each queue for main processing system 745 may be allocated different processing resources, including clock cycles, cores, memory, or some other processing resource. In some implementations, the selected queue for the encapsulated control packets may provide a better quality of service over the other processing queues, wherein the better quality of service can be provided by allocating fewer packets to the queue, providing additional resources to the queue, or providing some other source of improved quality of service.

Once the packet is allocated to the processing queue, packet processing operation 730 directs processing system 741 to process the packet, wherein the processing may include decapsulating the packet, updating one or more SDN appliances based on the packet, or providing some other operation on the packet.

Although described in the previous example as receiving an encapsulated packet with a set OAM flag, network interface system 750 may receive additional data packets that can be encapsulated or decapsulated. In response to receiving the packet, queue operation 770 may direct processing system 742 to perform packet inspection, determine that an OAM flag is not set in the packet, and allocate the packet to a queue that is different than the queue selected for the packets with the OAM flag. The queue selected for the non-control packets or the packets without the OAM flag can be selected based on the type of packet, random selection, or by some other means.

While demonstrated as receiving a packet at network interface system 750, egress packets may also be generated by one or more appliances, such as virtual machines or containers, on computing system 700. For example, a logical router executing on main processing system 745 may generate a control packet that is required to be communicated to a second computing system. To communicate the control packet to the second computing system, packet processing operation 730 may direct processing system 741 to identify a packet to be encapsulated and forwarded to a second computing system and determine that the packet comprises a control packet based on values in the packet. In some implementations, the control packet may be identified using filters and/or offsets that can distinguish a control packet from other data packets. In some examples, the determination of whether a packet comprises a control packet may occur at a VTEP or other tunnel endpoint, wherein a SDN appliance may generate a control packet that requires encapsulation to be forwarded to another computing system and SDN appliance. Once a control packet is identified, packet processing operation 730 may direct processing system 741 to encapsulate the packet as a Geneve packet with the OAM flag set in the encapsulation header. Once set, the encapsulated packet can be forwarded to the second computing system using network interface system 750.

Although demonstrated in the example of computing system 700 as performing the packet inspection using a processing system at network interface system 750, some computing systems may be incapable of performing the packet inspection to identify the OAM flag. In these examples, the packet inspection may be performed using an initial filtering operation by the main processing system.

Further, while demonstrated using the physical network interface to perform the filtering operations of the control packets based on the OAM flag, similar operations can be performed at a virtual network interface. In some implementations, virtual network interfaces may perform packet inspection on encapsulated packets and assign the packets to different processing queues based on values in the packet. In at least one example, the virtual network interface may assign packets with a set OAM flag to a particular processing queue, wherein the processing queue may provide different resources than other processing queues. The virtual network interfaces may be part of a virtual machine, container, or some other virtual appliance. In some examples, the VNIC itself may perform the operations, wherein the virtual network interface may allocate Geneve packets with a set OAM flag to a processing queue for the appliance. The processing queue for the OAM packet may be allocated different processing resources than the other processing queues for the appliance.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
in a first computing system, identifying a packet to be encapsulated and forwarded to a second computing system;
in the first computing system, determining that the packet comprises a control packet based on values in the packet;
in the first computing system and in response to determining that the packet comprises a control packet, encapsulating the packet as a Geneve packet, wherein an Operations and Management (OAM) flag is set in a header of the Geneve packet based on the packet comprising a control packet;
in the first computing system, communicating the Geneve packet toward the second computing system;
in the second computing system, receiving the Geneve packet at a network interface;
in the second computing system, assigning the Geneve packet to the processing queue;
in the main processing system of the second computing system, obtaining the Geneve packet from the processing queue;
in the main processing system of the second computing system, decapsulating the Geneve packet to obtain the packet; and
in the main processing system of the second computing system, forwarding the packet to a destination appliance.

2. The method of claim 1, further comprising:
in the second computing system, determining that the Geneve packet includes the OAM flag; and
in the second computing system and in response to determining that the Geneve packet includes the OAM flag, selecting a processing queue from a plurality of processing queues for a main processing system of the second computing system based on the OAM flag.

3. The method of claim 2, further comprising:
in the second computing system, receiving a second packet at the network interface;
in the second computing system, determining that the second packet does not include a set OAM flag;
in the second computing system and in response to determining that the second packet does not include the set OAM flag, selecting a second processing queue from the plurality of processing queues based on the second packet not including the set OAM flag; and
in the second computing system, assigning the second packet to the second processing queue.

4. The method of claim 3, wherein the processing queue comprises a quality of service better than the second processing queue.

5. The method of claim 3, wherein the processing queue is allocated a first set of processing resources for the main processing system of the second computing system, and wherein the second processing queue is allocated a second set of processing resources for the main processing system.

6. The method of claim 2, wherein determining that the Geneve packet includes the OAM flag, selecting the processing queue from the plurality of processing queues for the main processing system, and assigning the Geneve packet to the processing queue comprises:
in network interface processing system of the second computing system:
determining that the Geneve packet includes the OAM flag;
selecting the processing queue from the plurality of processing queues for the main processing system; and
assigning the Geneve packet to the processing queue.

7. A system comprising:
a first computing system; and
a second computing system configured to:
receive a Geneve packet at a network interface:
determine that the Geneve packet includes an Operations and Management (OAM) flag;
in response to determining that the Geneve packet includes the OAM flag, select a processing queue from a plurality of processing queues for a main processing system of the second computing system based on the OAM flag;
assign the Geneve packet to the processing queue;
in the main processing system:
obtain the Geneve packet from the processing queue;
decapsulate the Geneve packet to obtain the packet; and
forward the packet to a destination appliance.

8. The system of claim 7, wherein the first computing system is further configured to:
identify a packet to be encapsulated and forwarded to a second computing system;
determine that the packet comprises a control packet based on values in the packet;
in response to determining that the packet comprises a control packet, encapsulate the packet as the Geneve packet, wherein the OAM flag is set in a header of the Geneve packet based on the packet comprising a control packet; and
communicate the Geneve packet toward the second computing system.

9. The system of claim 7, wherein the second computing system is further configured to:
receive a second packet at the network interface;

determine that the second packet does not include a set OAM flag;

in response to determining that the second packet does not include the set OAM flag, select a second processing queue from the plurality of processing queues based on the second packet not including the set OAM flag; and assign the second packet to the second processing queue.

10. The system of claim 9, wherein the processing queue comprises a quality of service better than the second processing queue.

11. The system of claim 9, wherein the processing queue is allocated a first set of processing resources for the main processing system of the second computing system, and wherein the second processing queue is allocated a second set of processing resources for the main processing system.

12. The system of claim 7, wherein determining that the Geneve packet includes the OAM flag, selecting the processing queue from the plurality of processing queues for the main processing system, and assigning the Geneve packet to the processing queue comprises:

in network interface processing system of the second computing system:
determining that the Geneve packet includes the OAM flag;
selecting the processing queue from the plurality of processing queues for the main processing system; and
assigning the Geneve packet to the processing queue.

13. A computing apparatus comprising:
a storage system;
a processing system operatively coupled to the storage system;
program instructions stored on the storage system to manage processing queue assignment in a computing system that, when executed by the processing system, direct the computing apparatus to:
receive a Geneve packet at a network interface;
determine that the Geneve packet includes an Operations and Management (OAM) flag;
in response to determining that the Geneve packet includes the OAM flag, select a processing queue from a plurality of processing queues for a main processing system of the computing system based on the OAM flag;
assign the Geneve packet to the processing queue;
obtain the Geneve packet from the processing queue;
decapsulate the Geneve packet to obtain the packet; and
forward the Geneve packet to a destination appliance.

14. The computing apparatus of claim 13, wherein the program instructions further direct the computing apparatus to:
receive a second packet at the network interface;
determine that the second packet does not include a set OAM flag;
in response to determining that the second packet does not include the set OAM flag, select a second processing queue from the plurality of processing queues based on the second packet not including the set OAM flag; and
assign the second packet to the second processing queue.

15. The computing apparatus of claim 14, wherein the processing queue comprises a quality of service better than the second processing queue.

16. The computing apparatus of claim 14, wherein the processing queue is allocated a first set of processing resources for the main processing system of the computing system, and wherein the second processing queue is allocated a second set of processing resources for the main processing system.

17. The computing apparatus of claim 16, wherein the first set of processing resources comprise a first processing core allocation, a first clock cycle allocation, or a first memory allocation, and wherein the second set of processing resources comprise a second processing core allocation, a second clock cycle allocation, or a second memory allocation.

18. The computing apparatus of claim 13, wherein the processing system comprises a network interface processing system separate from the main processing system.

* * * * *